United States Patent
Goetsch et al.

(10) Patent No.: US 7,336,258 B1
(45) Date of Patent: Feb. 26, 2008

(54) ADJUSTABLE COMPUTER MOUSE STAND

(76) Inventors: Stephen R. Goetsch, 1204 W. Victory Blvd., Unit B, Burbank, CA (US) 91506; David D. Schultz, 735 N. Manhattan Pl., Los Angeles, CA (US) 90038

( * ) Notice: Subject to any disclaimer, the term of this patent is extended or adjusted under 35 U.S.C. 154(b) by 552 days.

(21) Appl. No.: 11/014,113

(22) Filed: Dec. 15, 2004

Related U.S. Application Data

(60) Provisional application No. 60/534,208, filed on Jan. 5, 2004.

(51) Int. Cl.
   *G09G 5/08* (2006.01)
(52) U.S. Cl. .................... 345/163; 345/156; 248/278.1
(58) Field of Classification Search ........ 345/156–164, 345/169; 248/118.1, 118.3, 276.1, 288.11, 248/288.31, 921, 278.1, 923
   See application file for complete search history.

(56) References Cited

U.S. PATENT DOCUMENTS

| | | | |
|---|---|---|---|
| 564,044 | A | 7/1896 | Berkemeyer |
| 2,069,890 | A | 2/1937 | MacDuff |
| 2,128,046 | A | 8/1938 | Heil |
| 2,467,041 | A | 4/1949 | Konikoff |
| 2,861,501 | A | 11/1958 | Strelakos |
| 2,876,359 | A | 3/1959 | Plymale |
| 2,888,617 | A | 5/1959 | Baumet |
| 2,910,260 | A | 10/1959 | Tanner |
| 2,950,836 | A | 8/1960 | Murdock |
| 2,993,395 | A | 7/1961 | Bohn |
| 2,995,983 | A | 8/1961 | Davis |
| 3,908,945 | A | 9/1975 | Shapiro et al. |
| 4,303,054 | A | 12/1981 | Lore |
| 4,321,660 | A | 3/1982 | Sokol |
| 4,365,561 | A | 12/1982 | Tellier et al. |
| 4,620,813 | A | 11/1986 | Lacher |
| 4,638,969 | A | 1/1987 | Brown |
| 4,742,980 | A | 5/1988 | Heigl |
| 4,770,380 | A | 9/1988 | Eason et al. |
| 4,807,837 | A | 2/1989 | Gawlik et al. |
| 5,067,834 | A | 11/1991 | Szmanda et al. |
| 5,207,791 | A * | 5/1993 | Scherbarth .............. 273/148 B |
| 5,279,488 | A | 1/1994 | Fleming |
| 5,466,078 | A | 11/1995 | Szmanda et al. |
| 5,630,566 | A | 5/1997 | Case |
| 5,653,499 | A | 8/1997 | Goodall |
| 5,683,064 | A * | 11/1997 | Copeland et al. ......... 248/278.1 |
| 5,769,369 | A | 6/1998 | Meinel |
| 5,868,079 | A | 2/1999 | Charny |
| 5,909,864 | A | 6/1999 | Wang |
| 5,988,572 | A | 11/1999 | Chivallier et al. |
| 6,053,461 | A * | 4/2000 | Goss .......................... 248/127 |
| D423,821 | S | 5/2000 | Crump |
| 6,086,034 | A | 7/2000 | McAllister et al. |

(Continued)

*Primary Examiner*—Richard Hjerpe
*Assistant Examiner*—Mansour M. Said

(57) ABSTRACT

A computer mouse stand which takes the form of a flat planar base from which extends upwardly an extensible telescoping tube assembly. The telescoping tube assembly is to be adjustable to various extended positions and then to be fixed in the selected extended position. The lower end of the extensible telescoping tube assembly may be fixedly secured to the base or may be secured to the base by means of a magnet. The upper end of the extensible telescoping tube assembly includes a ball socket with a ball to be mounted in conjunction with the socket. The ball can be connected to a platform or the ball could actually comprise a trackball.

3 Claims, 7 Drawing Sheets

U.S. PATENT DOCUMENTS

| | | |
|---|---|---|
| 6,123,387 A | 9/2000 | Kelly |
| 6,213,440 B1 | 4/2001 | Kornback |
| 6,262,715 B1 | 7/2001 | Sawyer |
| 6,526,896 B2 | 3/2003 | Woronecki et al. |
| 6,553,626 B2 | 4/2003 | Coburn |
| 6,688,563 B1 | 2/2004 | Waxham et al. |
| 6,702,373 B2 | 3/2004 | Rossko |
| 2001/0023915 A1* | 9/2001 | Hailson ................. 248/288.51 |
| 2003/0038782 A1* | 2/2003 | Dobrich ...................... 345/163 |

* cited by examiner

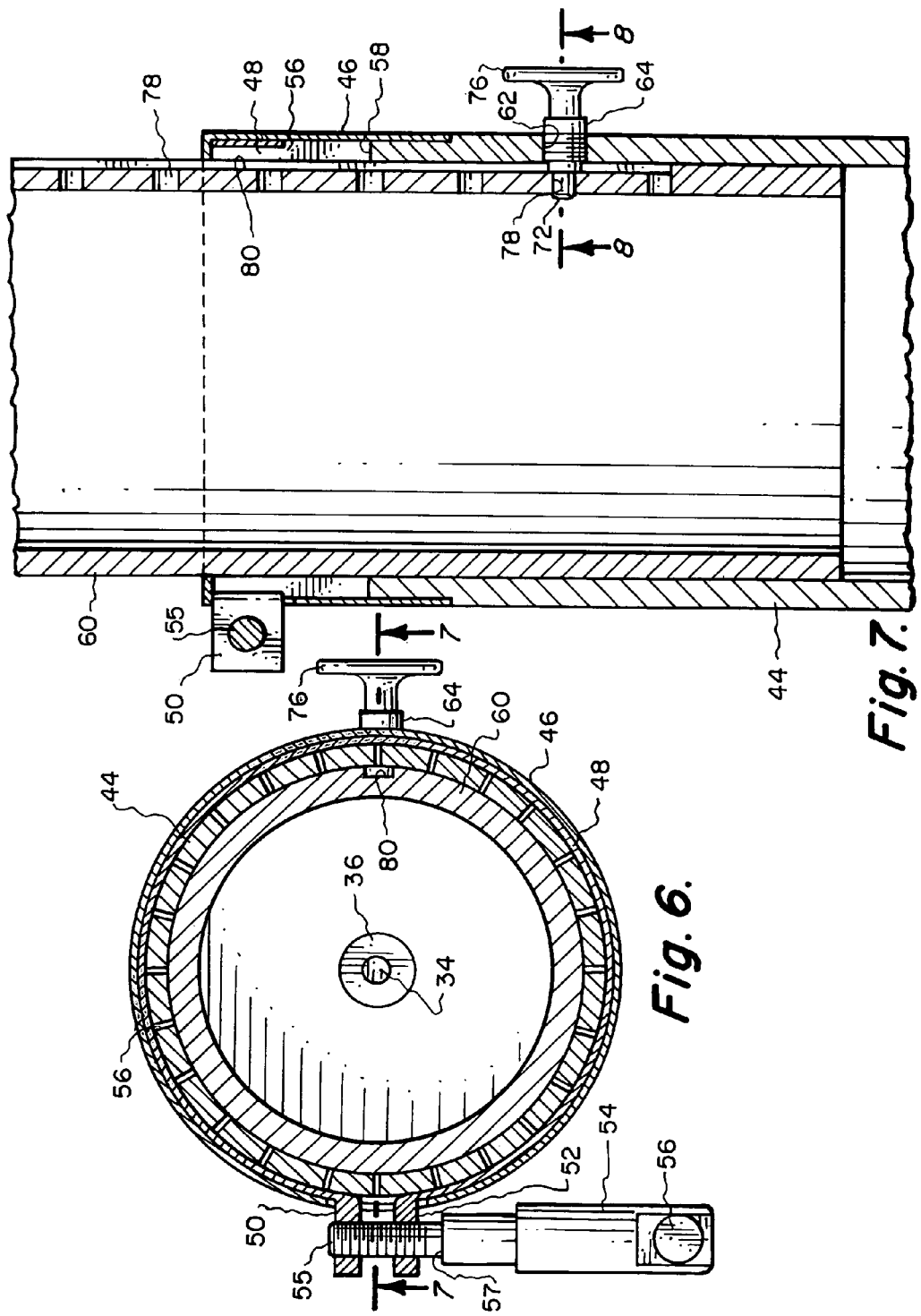

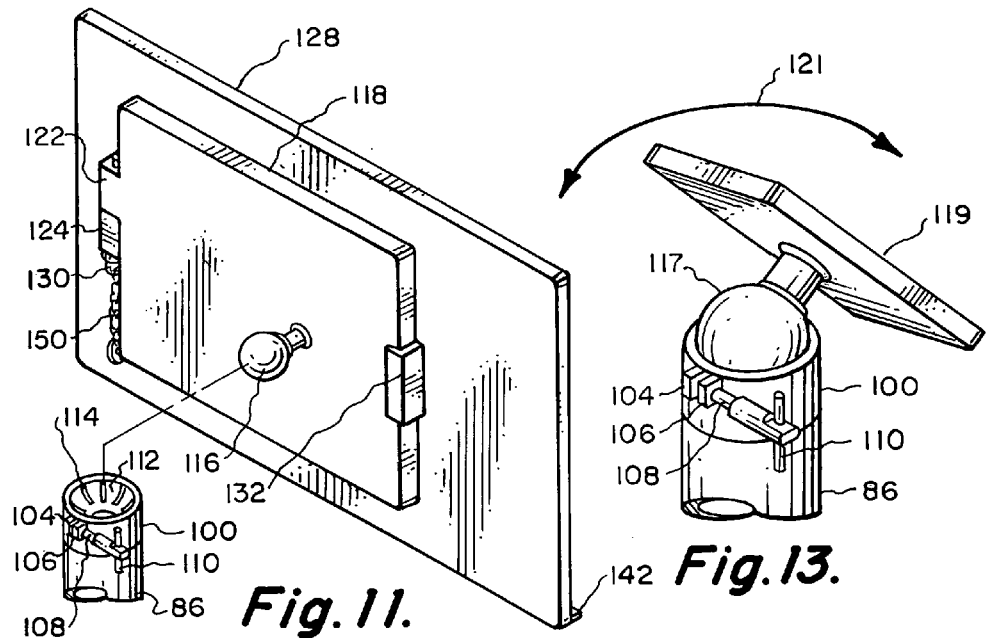
*Fig. 11.*  *Fig. 13.*
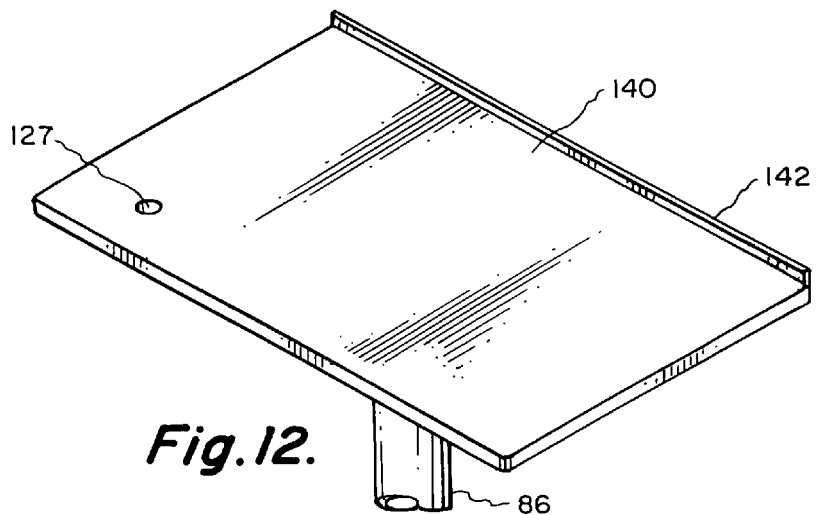
*Fig. 12.*

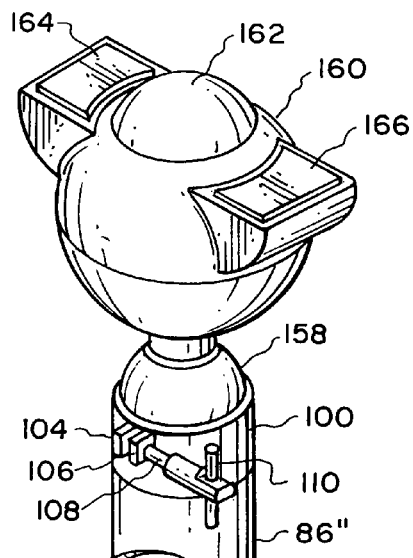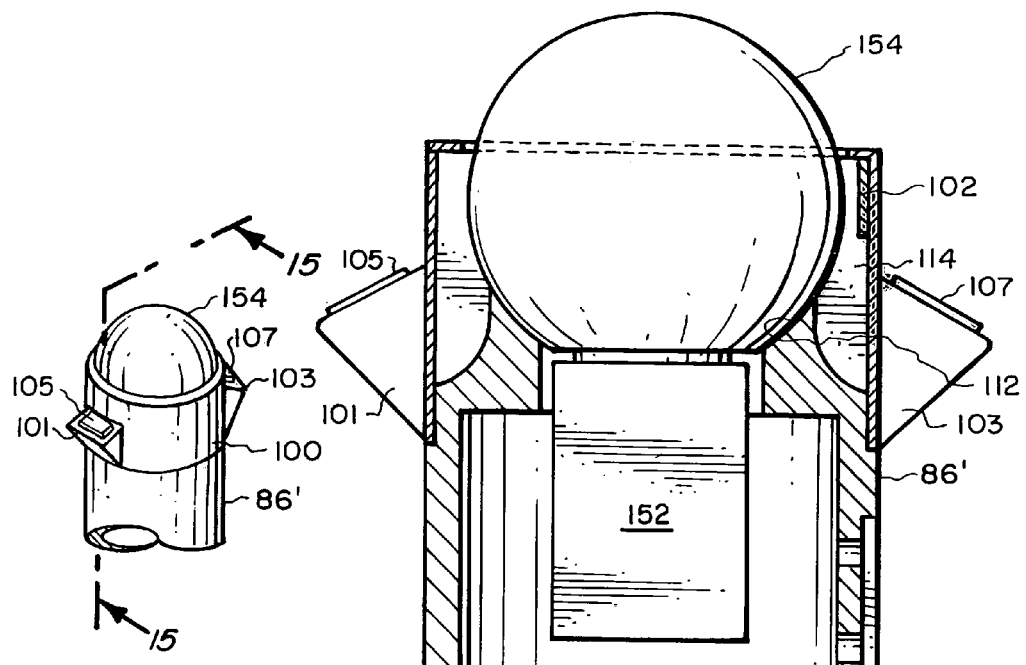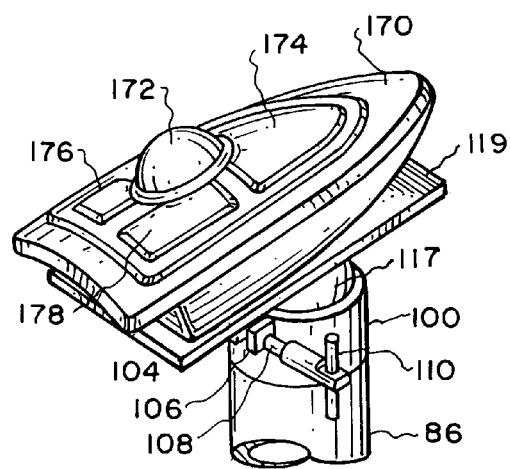
Fig. 14.
Fig. 15.
Fig. 16.
Fig. 17.

ADJUSTABLE COMPUTER MOUSE STAND

REFERENCE TO PRIOR APPLICATION

This application is a utility application based on a provisional patent application 60/534,208, filed Jan. 5, 2004, by the present inventors.

BACKGROUND OF THE INVENTION

1. Field of the Invention

The field of this invention relates to a stanchion or stand which is to be usable in conjunction with a computer mouse that can be adjusted by the user to ergonomically facilitate the usage of the mouse in conjunction with the stand.

2. Description of the Related Art

The term mouse is meant to include any kind of computer input device such as a trackball, touchpad, tablet and joystick.

In conjunction with computers, there is utilized a mouse. A mouse comprises a pointing device which provides an input for a viewpoint or cursor on a computer display that is moved across the display of a computer monitor. The mouse commonly utilizes a ball. Rolling of the ball on the surface causes the cursor on the computer screen to move to various locations.

Some people spend many hours per day on a computer. It is common for computers to be located on a desk. The user's arm and hand, when located on the mouse, is also located on the desk. The mouse is then moved on the desk which results in the cursor on the computer display being moved.

People that work on computers many hours per day are subject to certain health problems. One of these health problems is carpal tunnel syndrome. Another one would be muscle fatigue and repetitive stress injuries. These injuries occur within the hand and wrist area of the user with this being the hand or wrist that is used to move the mouse. There is no way that the user can adjust the position of the mouse as the work surface of the desk is at one fixed level. If some type of device could be utilized on which could be located the mouse and that device could be ergonomically altered to be comfortable to the specific user, it is believed that such a device would be in great demand.

Many places of business that utilize computers as a main work station by employees encounter significant health expense for these employees having to do with the repetitive stress injuries, carpal tunnel syndrome and muscle fatigue. Such places of business would like to be able to provide for their workers an alternate surface on which the mouse can be operated where the device could be adjusted to be most comfortable for the specific individual that is using it.

SUMMARY OF THE INVENTION

The primary objective of the present invention is to provide a computer user with position adjustability for a mouse when the individual is working at a computer. This position adjustability is to help reduce the effects of carpal tunnel syndrome, muscle fatigue and repetitive stress injuries by allowing the user to place the mouse in whatever position is most natural to their individual desires. The subject matter of this invention may also be used by people with disabilities and people that have a limited range of motion. The subject matter of this invention may also be used as a support system for existing computer workstations, such as an arm or wrist rest while utilizing existing input devices on a desktop. The subject matter of this invention could be used to hold a keyboard or laptop computer or even hold a monitor, printer, stenograph or any other similar item.

The basic embodiment of the present invention comprises a computer mouse stand which has a thin, substantially planar base on which is mounted an extensible telescoping tube assembly. The upper end of the telescoping tube assembly includes a ball socket. An attachment, which has a ball interconnecting with a ball socket, is to be adjustably movable within the ball socket. A portion of the ball extends exteriorly of the ball socket.

A further embodiment of the present invention is where the basic embodiment is modified by defining that the base has three in number of points of support with there being an enlarged recess formed in the base structure and located between two of the points of support.

A further embodiment of the present invention is where the basic embodiment is modified by defining that the extensible telescoping tube assembly is capable of being fixed in various extended positions.

A further embodiment of the present invention is where the basic embodiment is modified by defining that the lower end of the telescoping tube assembly includes a magnet with this magnet to permit attachment on the base at any desired position on the base not requiring to be fixed at a single position on the base.

A further embodiment of the present invention is where the basic embodiment is modified by there being defined that there is a first platform mounted on a ball which is in turn mounted in the ball socket.

A further embodiment of the present invention is where the just previous embodiment is modified by defining that the first platform is tiltable vertically within a range of about fifty-five degrees over the horizontal range of movement of three hundred sixty degrees.

A further embodiment of the present invention is where a previous embodiment is modified by there being utilized a second platform that is mounted in conjunction with the first platform.

A further embodiment of the present invention is where the first basic embodiment is modified by the second platform having a groove with the peripheral lip of the first platform being mounted in this groove when the second platform is mounted on the first platform.

A further embodiment of the present invention is where the basic embodiment is modified by there being included a clamping ring in conjunction with the ball socket so that the clamping force can be varied so that a snug mounting can be obtained which will remain in a fixed established position but at the same time will permit adjustability of the platform if it is desired that the platform needs to be adjusted.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 6 is a transverse cross-sectional view through the extensible telescoping tube assembly of the adjustable computer mouse stand of the present invention taken along line 6-6 of FIG. 1;

FIG. 7 is a cross-sectional view taken along line 7-7 of FIG. 6;

FIG. 11 is an isometric view showing the first platform connected to the second platform utilized in conjunction with the adjustable computer mouse stand of the present invention;

FIG. 12 is an isometric view of the upper surface of the second platform utilized in conjunction with the adjustable computer mouse stand of the present invention;

FIG. 13 is a view of the upper end of the telescoping tube assembly depicting how an optional input device platform can be adjusted relative to the telescoping tube assembly;

FIG. 14 is an additional embodiment of upper end of telescoping tube assembly that incorporates a trackball directly in conjunction with the ball socket that is mounted at the upper end of the telescoping tube assembly;

FIG. 15 is a cross-sectional view taken along line 15-15 of FIG. 14;

FIG. 16 shows a further embodiment of trackball that could be incorporated in conjunction with the upper end of the telescoping tube assembly of the adjustable computer mouse stand of the present invention; and FIG. 17 shows a still further embodiment of an available input device such as a trackball that could be incorporated in conjunction with the telescoping tube assembly of the adjustable computer mouse stand of the present invention.

DETAILED DESCRIPTION OF THE INVENTION

Figure 1:
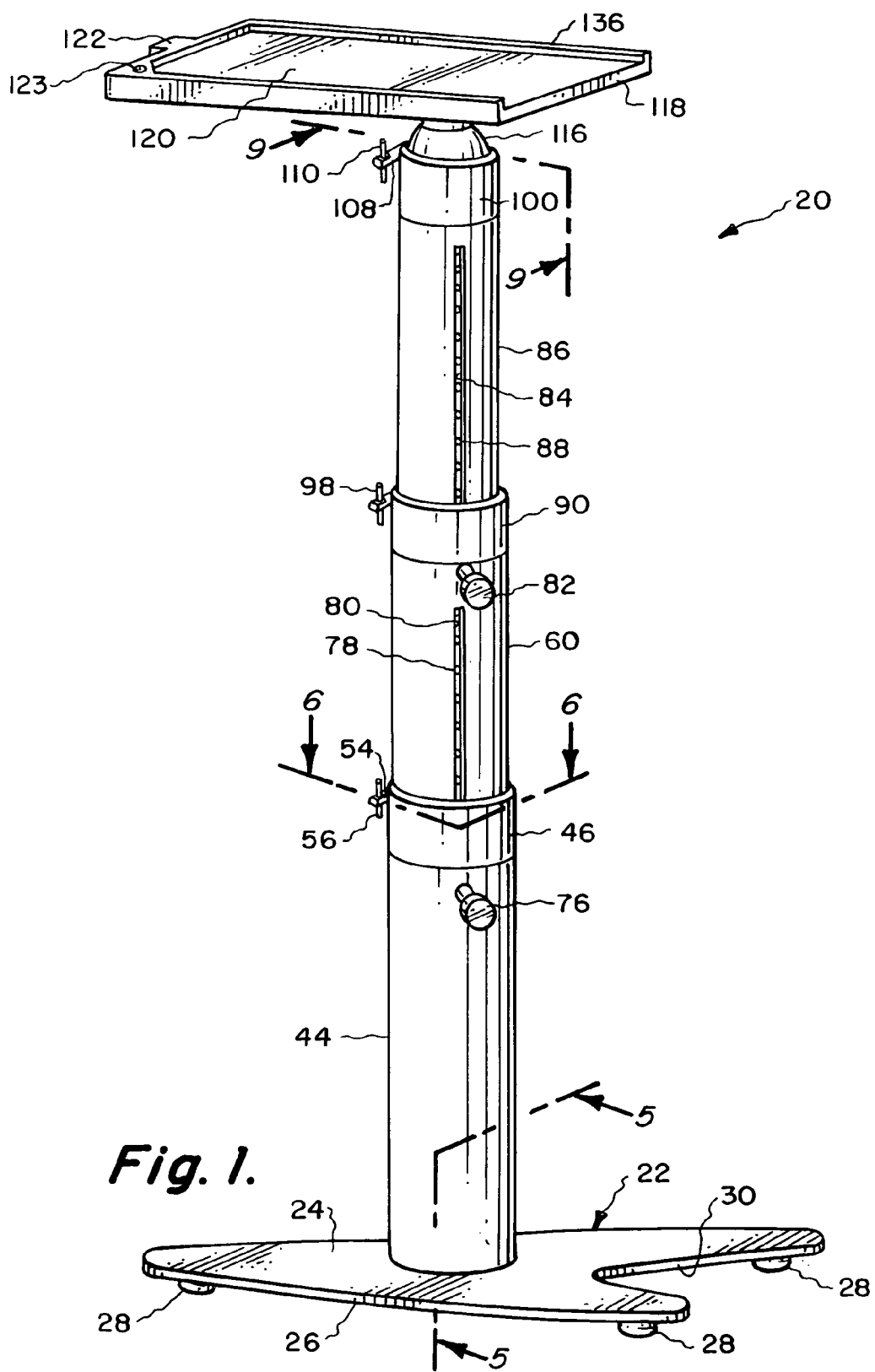
FIG. 1 is a frontal isometric view of the adjustable computer mouse stand of the present invention.

Referring particularly to the drawings, there is shown the first embodiment 20 of mouse stand of this invention. The mouse stand 20 utilizes a sheet material planar base 22 which has an upper surface 24 and a bottom surface 26. The material of construction for the base 22 will be metal with generally steel being preferred. Plastic could also be used. Mounted on the bottom surface 26 are three different points of support in the form of resilient feet 28. The base 22, located between a pair of the feet 28, includes an enlarged recess 30. The function of the recess 30 is to permit the base 22 to be placed under a piece of furniture with a leg of the furniture (not shown) to be located within the recess 30. The use of the recess 30 is to provide the user with a greater variety of placement locations of the first embodiment 20 of mouse stand of this invention.

There will normally be included a centrally located hole 32 within the base 22. The hole 32 is to be able to connect with a screw fastener 34. The screw fastener 34 is to connect with a plug 36. Plug 36 is fixedly mounted within a magnet 38. The magnet 38 has an exterior surface which is coated with a protective coating 40 with generally the coating being of a plastic composition. The coating 40 is to abut directly against the upper surface 24. The magnet 38 is fixedly mounted within the lower end 42 of a tube 44. It is to be understood that by eliminating of the bolt fastener 34 that the telescoping tube assembly can be moved to any position on the upper surface 24 according to individual desires. The telescoping tube assembly will remain in the established position on the base 22 by means of the magnet 38.

The tube 44 is basically cylindrical in configuration and would generally be constructed of a metal or plastic material. Typically, the tube 44 will have a length of between one to two feet. The upper end of the tube 44 has an ornamental band 46. The band 46 surrounds a clamping band 48. The band 46 is strictly for ornamentation purposes and is intended to cover the clamping band 48. The clamping band 48 terminates in a pair of ends 50 and 52. Ends 50 and 52 include threaded holes which connect with a manually turnable nut 54. The outer end of the nut 54 includes a threaded member 55 with there being a shoulder 57 formed on the nut 54. Manually turning of the nut 54 by application of manual force to handle 56 will cause the shoulder 57 to abut against the end 52 and move such closer to end 50. This will result in an annular clamping force being applied by the clamping band 48 onto the upper end of the tube 44. This upper end of the tube 44 has a series of evenly spaced apart slots which are shown to be twenty-four in number. However, the number of the slots 58 can be increased or decreased without departing from the scope of this invention. The slots 58 permit the upper end of the tube 44 to move tightly against tube 60 which is telescopingly mounted within the tube 44. Therefore, tightening of the nut 56 causes an annular clamping force to be applied from tube 44 to tube 60 and thereby fix tube 60 on tube 44.

Formed through the sidewall of the tube 44 is a hole 62. Mounted within the hole 62 is a cap 64. Located within the cap 64 is a coil spring 66. One end of the coil spring 66 abuts against the inside forward surface of the cap 64, which is basically closed except for the exception of a hole 68, with the other end of the coil spring 66 abutting against annular flange 70 which is mounted on a pin 72. The inner end of the pin 72 includes a threaded section 74 which is threadably engaged with a knob 76. The pin 72 is capable of being located within a hole 78 formed within the tube 60. There are ten or twelve in number of evenly spaced apart holes 78 all located in a single line. Each of the holes 78 connect with an elongated groove 80. Pulling outward on the knob 76 can cause the pin 72 to be disengaged from a hole 78 but the pin 72 will still be engaged with the groove 80. The function of the groove 80 is to ensure that the tube 60 is not capable of being rotated relative to the tube 44 so that the tube 60 only can move in a lineal direction relative to the tube 44. It is to be understood that the pin 72 is capable of connecting with any one of the holes 78 with the result that the tube 60 can be only slightly extended relative to the tube 44 or the tube 60 can be extended a significant distance almost double the length of tube 44.

Mounted within the body of the tube 60 is another knob 82 which connects with a pin, which is similar to pin 72, which in turn rides within a groove 84 formed within the body of a tube 86. Tube 86 is telescopingly mounted within the confines of tube 60. Associated with the groove 84 are a plurality of evenly spaced apart holes 88 with it being understood that the pin that is attached to knob 82 is capable of engaging with any one of the holes 88 and rides within the groove 84 thereby keeping the tube 86 from rotating relative to the tube 60. Incorporated with the upper end of the tube 60 is a band 90 which is basically similar to band 46. Mounted on the band 90 is a threaded member 92 which operates in conjunction with a pair of ends 94 and 96 of a clamping band, which is not shown, which is mounted on the inside surface of the band 90. The upper end of the tube 60 also includes a series of slots, which are not shown, which are similar to slots 58. Tightening of the clamping band by turning of threaded member 92 by means of handle 98 will result in the tube 60 to be tightly clamped onto the tube 86.

The tubes 44, 60 and 86 constitute a telescoping tube assembly. With the threaded members 55 and 92 loosened, the tube 60 can readily move relative to tube 44 as long as knob 76 is pulled outwardly so that the pin 72 is out of engagement from a hole 78. Once a desired hole 78 is selected, the knob 76 is released and the pin 72 engages with that particular selected hole and now the tube 60 is longitudinally fixed in position relative to the tube 44. To tightly secure tube 60 to tube 44, the nut 54 is then turned to clamp together tubes 44 and 60. The same procedure can be accomplished relative to tubes 60 and 86 with the net result that the telescoping assembly can be extended between a distance of one foot to three feet in length.

The upper end of the tube 86 includes a cap 100. Associated with the cap 100 is a clamping band 102. Clamping band 102 terminates in a pair of ends 104 and 106. Connecting with the ends 104 and 106 is a threaded member 108. The threaded member 108 has mounted thereon a handle 110. The upper end of the tube 86 is formed into a ball socket 112. The ball socket 112 includes a series of evenly spaced apart slots 114. A ball 116 is to be located in a close conforming manner within the ball socket 112. The ball 116 can be tightened within the ball socket 112 by causing rotation of threaded member 108 which moves ends 104 and 106 closer together which will cause the construction of the ball socket 112 to move slightly inwardly, which is permitted by the slots 114. In this way, the ball 116 can be made to be easily movable within the ball socket 112 or can be made to be movable but yet require a degree of force in order to effect the movement. Also, the ball 116 could be tightly secured within the ball socket 112 by completely tightening the threaded member 108.

The ball 116 is mounted onto a first platform 118. First platform 118 is basically planar in construction and has an outer surface 120 which can be utilized by a user as a working surface, such as permitting movement of a mouse thereon, which is not shown. The first platform 118 includes an extension 122 which is capable of abutting against an extension 124 which is mounted on the undersurface 126 of a second platform 128. The extension 122 is to be located in abutting alignment with the extension 124 and within each of these extensions are a through hole through which is to be conducted a locking pin 130. The locking pin 130 functions to secure the first platform 118 to the second platform 128 with the forward end of the first platform 118 connecting with a hook 132 to hold the first platform 118 in abutting connection with the second platform 128. The outer surface 120 of the first platform 118 is surrounded by a peripheral lip 136. The peripheral lip 136 will function to keep the mouse confined to the area of the working surface 120. The peripheral lip 136 is to be locatable in conjunction with a groove 138 formed in the undersurface 126 of the second platform 128. The peripheral lip 136 in connection with the groove 138 then securely locks together the first platform 118 to the second platform 128. The exterior surface 140 of the second platform 128 is to be used as a working surface and may be not only used in conjunction with a mouse but also will support a laptop computer, keyboard or other electronic related structure. The exterior surface 140 has a lineal edge strip 142 on one edge of the platform 128. The platform 118 may also include a spirit level 123 for the user to use to perfectly level the platform 118. There is a hole 127 in second platform 128 that permits a user to observe the spirit level 123.

Figures 2, 3:
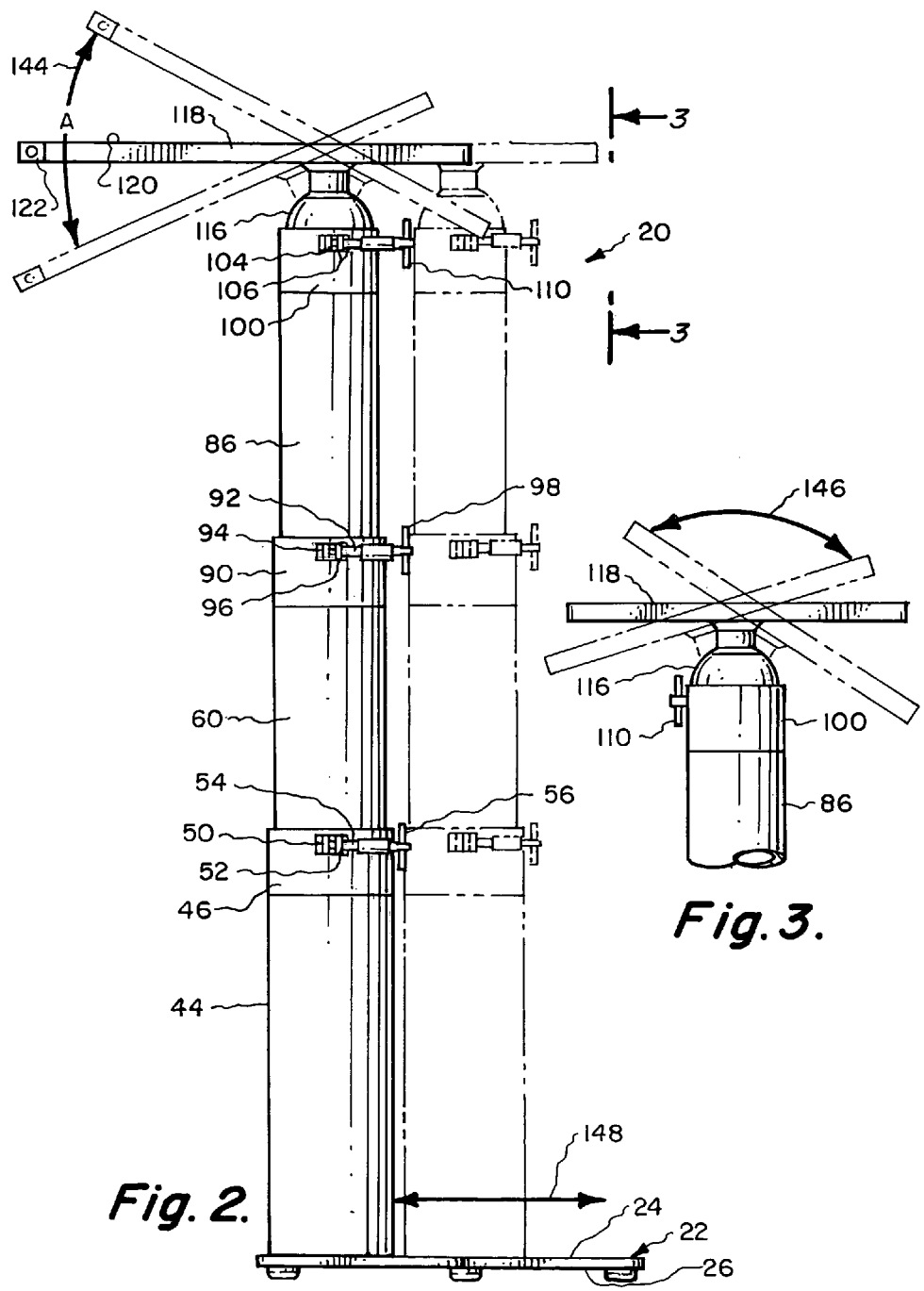
FIG. 2 is a rear directional isometric view of the adjustable computer mouse stand of the present invention showing how the platform is mounted at the upper end of the mouse stand and can be adjusted to various vertical angular positions.
FIG. 3 is a right side view of the upper portion of the adjustable computer mouse stand of the present invention depicting further the adjustability of the platform which is mounted at the upper end of the stand.
Figure 4:
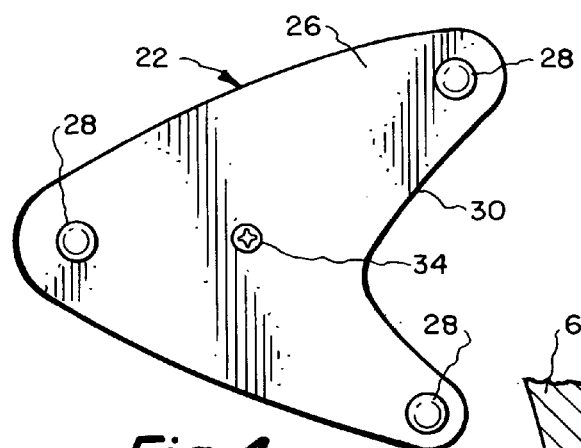
FIG. 4 is a bottom plan view of the base of the adjustable computer mouse stand of the present invention.
Figure 8:
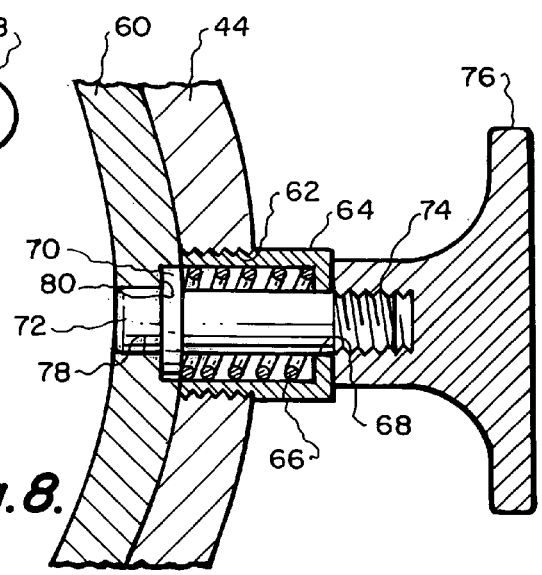
FIG. 8 is a cross-sectional view taken along line 8-8 of FIG. 7 showing in more detail the spring biased pin that is utilized in conjunction with the adjustable computer mouse stand of the present invention.
Figure 5:
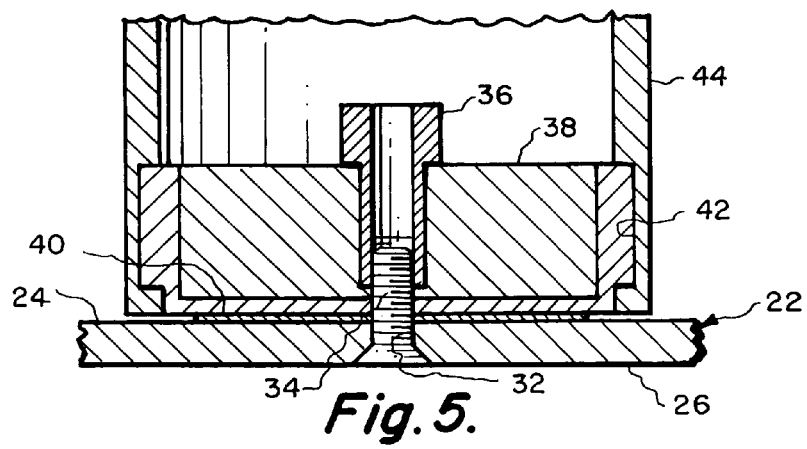
FIG. 5 is a cross-sectional view through the bottom portion of the adjustable computer mouse stand of the present invention taken along line 5-5 of FIG. 1.
Figure 9:
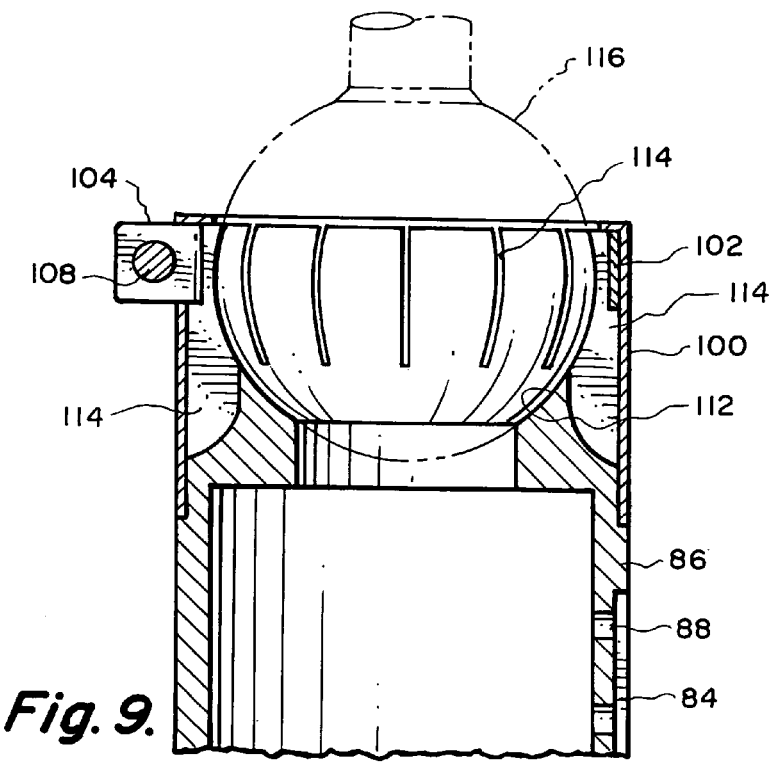
FIG. 9 is a cross-sectional view through the upper end of the adjustable computer mouse stand of the present invention showing more clearly the ball socket located at the upper end of the mouse stand.
Figure 10:
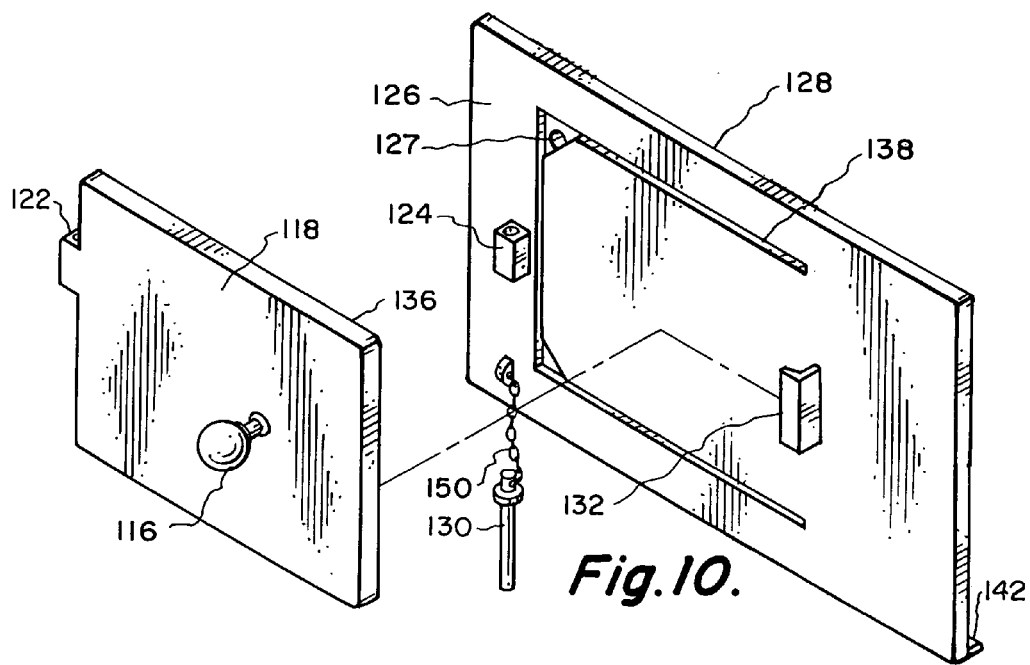
FIG. 10 is an isometric view showing a first platform separated from a second platform and depicting how such could be connected together.

It is also to be understood that the first platform 118 can be moved to an angle of about fifty-five degrees in a vertical direction, which is depicted by arrow 144, with this angle being denoted as A, although any angle could be used up to ninety degrees. It is to be understood that this vertical movement of the first platform 118 and also the second platform 128, if it is attached to the first platform 118, can be in any vertical direction as further exemplified by arrow 146. The movement of the first platform 118 and the second platform 128 if it is attached can be accomplished in any vertical direction along three-hundred sixty degrees in the horizontal direction. The movement of the telescoping tube assembly on the base 24 is depicted generally in the dotted line position shown in FIG. 2 with this movement being depicted by arrow 148. The locking pin 108 is to be fixedly connected to the undersurface 126 of the second platform 128 by means of a chain 150. Platform 128 has a hole 127 to enable the user to observe spirit level 123 when platform 128 is mounted on platform 118.

Referring particularly to FIG. 13, there is shown a modified form of the invention with like numerals being used to refer to like parts. The only difference is that the ball 117 is attached to a smaller in sized platform 119 which may be referred to as an optional input device platform which may be desired by some users. The platform 119 can be used to mount a user's own trackball or other input device. Platform 119 is adjustably movable as indicated by arrow 121 prior to tightening of threaded member 108.

Referring particularly to FIGS. 14 and 15, there is shown the upper end of a tube 86' which is basically similar to tube 86 with like numerals being used to refer to like parts. The socket 112 may have associated with it electronics, such as in the electronics 152 commonly associated with a trackball or other input devices. The electronics 152 would be mounted within the confines of the upper end of the tube 86'. Rotation of the ball 154 can cause movement of a curser on a computer screen, which is not shown. The upper end to be 86' will also include button housings 101 and 103 on which are mounted respectively buttons 105 and 107.

Referring particularly to FIG. 16, there is shown a modified form of the invention where the upper end of the tube 86" has a ball 158 mounted thereon. The ball 158 is connected to a larger ball 160 within which is mounted a rotatable trackball 162. Mounted on the ball 160 are buttons 164 and 166. The buttons 164 and 166 can be activated by the user when necessary to perform certain procedures on a computer monitor screen, which is not shown. Buttons 164 and 166 are similar to buttons that are typically associated with a computer input device. Rotation of the rotatable trackball 162 will result in movement of a curser on that screen.

Referring particularly to FIG. 17, there is shown yet a further embodiment of the invention where the upper end of the tube 86 has mounted therein the ball 117. Ball 117 is attached to platform 119. The user would mount on platform 119 their own trackball or other input device. It is to be understood that within both embodiments in FIGS. 16 and 17 the ball 160 and the mouse housing 170 can be canted to any desirable position and then fixed in that position by tightening of threaded member 108.

Although the structure of this invention is intended to be made of plastic, it is to be considered possible that the structure could be constructed of almost entirely of metal, carbon fiber and possibly even wood. The structure of this invention can be in any color and can be painted. Base 22 can be made of any desirable size. Base 22 can also be made in very different styles and shapes. There also could be incorporated in conjunction with a base a plurality of the holes 32 to provide for multiple positions for anchoring of the telescoping tube assembly to the base 22. The clamping method and arrangement of the telescoping tube assembly, comprising clamping bands 48 and 102, can be readily altered, if such is desired, without departing from the scope of this invention. The integrated trackball 162 and 172 that is shown in FIGS. 16 and 17 can be altered in many ways to include more functions, more buttons, as well as changing the position of the buttons on the units. The trackball can be made in varying sizes and could be made large enough for a person to rest his or her hand on the ball. The electronic mechanism associated with the structure of this invention could be of any type of control device from a standard wire device to infrared, optical or wireless. A touch pad or other input device could be also easily mounted on the outer surface 119 or 120, if such were desired. The amount of vertical adjustment for the balls 116 and 117 could be any desired amount such as up to ninety degrees.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An adjustable computer mouse stand comprising
a substantially planar base;
an extensible telescoping tube assembly having an upper end and a lower end; said lower end mounted on said base, a ball socket mounted on said upper end; and
an attachment having a ball interconnecting with said ball socket, said ball being adjustably movable within said ball socket, a portion of said ball extending exteriorly of said ball socket wherein
said lower end of said extensible telescoping tube assembly including a magnet, said magnet to provide a temporary fixation of said mouse stand on said base with said telescoping tube assembly capable of being mounted in any position on said base and remain fixed in that position by said magnet.

2. An adjustable computer mouse stand comprising
a substantially planar base;
an extensible telescoping tube assembly having an upper end and a lower end; said lower end mounted on said base, a ball socket mounted on said upper end;
an attachment having a ball interconnecting with said ball socket, said ball being adjustably movable within said ball socket, a portion of said ball extending exteriorly of said ball socket, said attachment comprising a first platform, said first platform having an exterior planar surface adapted to function as a working surface wherein
a second platform being mounted on said first platform, said second platform being substantially larger in size than said first platform, said second platform having a working surface, a lineal upstanding edge on said second platform at its periphery.

3. An adjustable computer mouse stand comprising
a substantially planar base;
an extensible telescoping tube assembly having an upper end and a lower end, said lower end mounted on said base, a ball socket mounted on said upper end; and
an attachment having a ball interconnecting with said ball socket, said ball being adjustable movable within said ball socket, a portion of said ball extending exteriorly of said ball socket wherein
said second platform having an undersurface, said undersurface having a groove, said first platform having a peripheral lip surrounding said exterior planar surface, said peripheral lip being mounted within said groove when said second platform is mounted on said first platform.

\* \* \* \* \*